United States Patent [19]
Haupt

[11] Patent Number: 5,820,180
[45] Date of Patent: Oct. 13, 1998

[54] ADJUSTABLE MULTI-PURPOSE LIFTING APPARATUS

[76] Inventor: Edward Haupt, 611½ 6th St., Trafford, Pa. 15085

[21] Appl. No.: 906,167

[22] Filed: Aug. 5, 1997

[51] Int. Cl.⁶ ........................................... B65G 7/12
[52] U.S. Cl. ............................................. 294/16; 294/104
[58] Field of Search .............................. 294/2, 3, 15, 16, 294/28, 62, 103.1, 104; 7/167, 168

[56] References Cited

U.S. PATENT DOCUMENTS

| 884,494 | 4/1908 | Kerr | 294/62 |
| 1,041,949 | 10/1912 | Bandemer | 294/62 |
| 1,586,475 | 5/1926 | Schondelmayer et al. | 294/62 |
| 2,005,176 | 6/1935 | Arbuckle | 7/167 |
| 5,039,150 | 8/1991 | Jones et al. | 294/62 |

FOREIGN PATENT DOCUMENTS

| 1160933 | 8/1958 | France | 294/62 |
| 569151 | 11/1957 | Italy | 294/62 |

*Primary Examiner*—Dean Kramer
*Attorney, Agent, or Firm*—H. Keith Hauger, Esq.

[57] ABSTRACT

The present invention is an adjustable multi-purpose lifting apparatus for lifting ties, logs and the like. This invention consists of a fulcrum member having a lever handle integrally attached to a rotational gripping clamp and a second and opposing static gripping clamp connected by a telescopic horizontal structural member, such that when a workman places the tie, log or other object between the gripping clamps and exerts an upward lifting force, the apparatus automatically closes tightly against an outside surface of the tie, log or other object for easy and safe lifting and transportation. A button spring mechanism allows the telescopic horizontal structural member to vary its length and to lock onto a given width of the tie, log or other object. A release grip allows the load to be readily disengaged. Lastly, an added feature is a self-contained hand tool, like a cutting tool, which is safely and conveniently stored within the lever handle to sever packaging bands which wrap a bundle of ties, logs, pipes or other similar construction components which may be lifted with this invention.

11 Claims, 3 Drawing Sheets

ADJUSTABLE MULTI-PURPOSE LIFTING APPARATUS

BACKGROUND OF THE INVENTION

1. Field of the Invention

This invention relates generally to an adjustable multi-purpose lifting apparatus and/or specifically an apparatus for lifting ties, logs and the like. Railroad ties, decorative ties, logs and other structural members are often constructed in lengths of eight (8) feet or more and weigh more than one hundred (100) pounds, making them cumbersome to lift and lay in place. The present invention is designed to accommodate workers in the construction and landscaping business by eliminating the need for more than one man to lift the subject invention. An added feature to the present invention is a self-contained hand tool which may be designed for a variety of uses including as a band cutting tool to cut the band or other form of fastening strip which is wrapped around the subject ties, logs and other structural elements.

2. Description of the Prior Art

The prior art includes a variety of lifting devices for lifting articles primarily of rectangular, circular or square cross sections. One previous device illustrated in Jones U.S. Pat. No. 5,039,150 operates as a tool for lifting bricks between a set of clamping jaws. Likewise, a brick handling device is claimed by Jackson in U.S. Pat. No. 747,181. Jackson designed a tool which consists of two members that slide to grasp a load of bricks. U.S. Pat. No. 1,364,128 to Messinger is essentially a pair of tongs for grasping and carrying a series of bricks. U.S. Pat. No. 4,055,364 issued to Breite is a tool for lifting batteries with two upright legs, whereby a gripping shoe on the inside of each leg engages the object to be lifted which is primarily vehicular batteries. Viola's U.S. Pat. No. 4,678,217 also claims a carrier tool for lifting batteries consisting of twin L-shaped levers connected at a central pivot point, whereby gripping teeth engage the battery on an outside surface. A final example of the prior art is illustrated at U.S. Pat. No. 1,465,892 issued to Burgess and consisting of a simple pair of tongs having inward pointing projections on each leg to engage an object such as a tie.

SUMMARY OF THE INVENTION

It is, therefore, an object of the present invention to provide an adjustable multi-purpose lifting apparatus that is simply constructed and cost effective to produce.

It is the further object of the present invention to provide an adjustable multi-purpose lifting apparatus that is adjustable to the width of the object to be lifted by means of a nut and bolt means which locks a male sliding channel to a female sliding channel at variable apertures thereon.

It is the further object of the present invention to provide a multi-purpose lifting apparatus that is adjustable to the width of the object to be lifted by use of a locking device in the form of a quick release pin located at variable apertures along sliding opposing male and female channels.

It is the further object of the present invention to provide an adjustable multi-purpose lifting apparatus consisting of a fulcrum member for application of a clamping force against an outside surface of the object to be lifted, i.e., railroad ties, decorative ties, logs, blocks, pipe and brick.

It is the further object of the present invention to provide an adjustable multi-purpose lifting apparatus with a U-shaped handle which lessens the amount of force needed to lift heavy objects and makes balancing of the object a simple task.

It is the further object of the present invention to provide an adjustable multi-purpose lifting apparatus which is safe for a worker to use in lifting a load.

It is the further object of the present invention to provide an adjustable multi-purpose lifting apparatus that is compact for easy storage and portable for transporting said apparatus.

It is the further object of the present invention to provide an adjustable multi-purpose lifting apparatus which incorporates a self-contained band cutting or other tool for ready use on the job at hand.

It is the further object of the present invention to provide an adjustable multi-purpose lifting apparatus which features a release grip for quick one-hand release of the load.

It is the further object of the present invention to provide an adjustable multi-purpose lifting apparatus that is constructed of rugged, durable, ribbed, reinforced gripping clamps having a coarse inside surface for locking onto an outside surface of the load and especially a heavy load.

It is the further object of the present invention to provide an adjustable multi-purpose lifting apparatus which will last a lifetime and not require maintenance.

More specifically, the present invention is an adjustable multi-purpose lifting apparatus for lifting ties, logs and the like, comprising a fulcrum member means including an arched lever handle for applying rotational forces about a predetermined pivot point to an integrally attached rotational gripping clamp; a telescopic horizontal structural member including a rigid female slide channel and a rigid male slide channel, said rigid male slide channel being fixed to a static gripping clamp opposing said rotational gripping clamp, whereby said telescopic horizontal structural member is capable of translational movement by passing opposing surfaces of said rigid male slide channel and said rigid female slide channel for elongation or compression of said telescopic horizontal structural member, causing said rotational gripping clamp and said static gripping clamp to engage said ties, logs and the like; a locking means consisting of a first aperture means comprising a first plurality of spaced orifices arranged along an outside surface of said female slide channel and a second plurality of spaced orifices arranged along an outside surface of said male slide channel such that said first plurality of spaced orifices align with said second plurality of spaced orifices in opposing pairs for passage therethrough of a first nut bolt means enabling a first nut to be securely affixed to a first bolt causing said rotational gripping clamp to be held at a fixed distance from said static gripping clamp.

These objects, as well as other objects and advantages of the present invention will become apparent from the following description in reference to the illustrations appended hereto.

BRIEF DESCRIPTION OF THE DRAWINGS

For a better understanding of the invention, reference may be had to the accompanying drawings in which.

DESCRIPTION OF PREFERRED EMBODIMENTS

Figure 1:
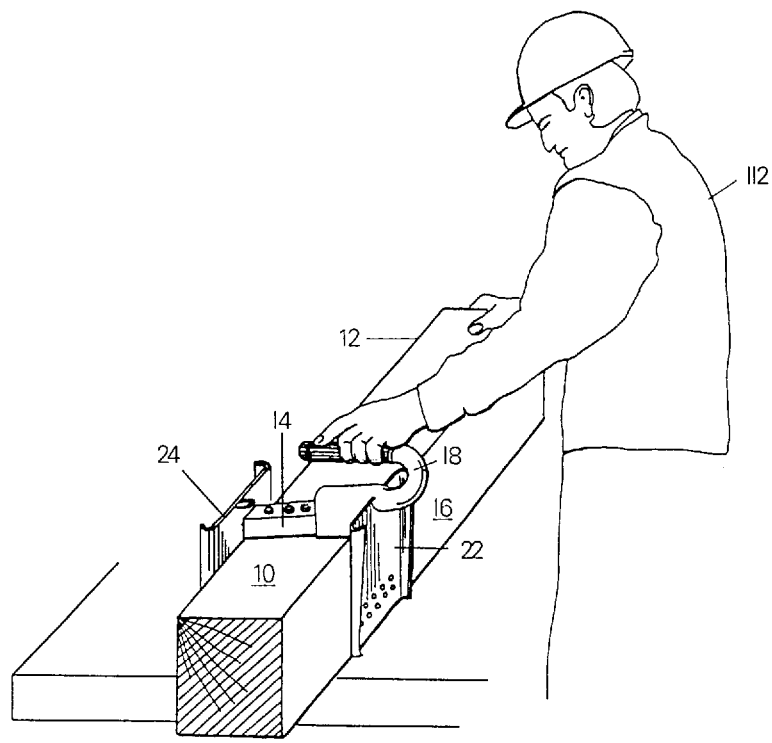
FIG. 1 is an isometric view of an adjustable multipurpose lifting apparatus for lifting ties, logs and the like which illustrates the operation thereof.

Referring to FIGS. 1 through 6, there is illustrated an adjustable multi-purpose lifting apparatus 10 being the present invention. It has been discussed in the Background of the Invention that the subject invention is used to lift heavy structural elements which are often difficult, cumbersome and hazardous to handle. The present invention provides a safe and efficient tool for performing such a job. Referring to the drawings, FIG. 1 represents an isometric view of an adjustable multi-purpose lifting apparatus 10 in operation lifting a railroad or decorative tie 12. Fulcrum member means 16 is comprised of an arched lever handle 18 which is used by a workman 112 to grasp tie 12 by applying a rotational force about a predetermined pivot shaft 70 consisting of a nut and bolt means 64. A rotational gripping clamp 22 is an integral part of the fulcrum member means 16 to engage an opposing static gripping clamp 24 by a telescopic horizontal structural member 14. Said telescopic horizontal structural member 14 consists of a rigid female slide channel 26 and a rigid male slide channel 28 which engage rotational gripping clamp 22 and static gripping clamp 24 about tie 12.

Telescopic horizontal structural member 14 is capable of transitional movement 30 by passing outside surface 32 of male slide channel 28 through inside surface 34 of female slide channel 26 for elongation or compression of telescopic horizontal structural member 14.

Figure 2:
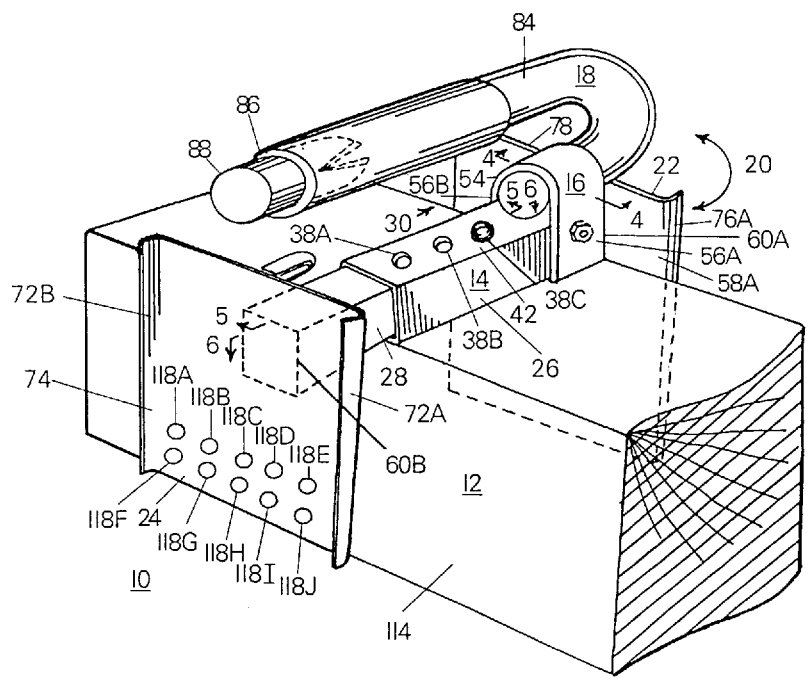
FIG. 2 is a second isometric view of an adjustable multi-purpose lifting apparatus for lifting ties, logs and the like being an overall perspective view of the present invention.
Figure 5:
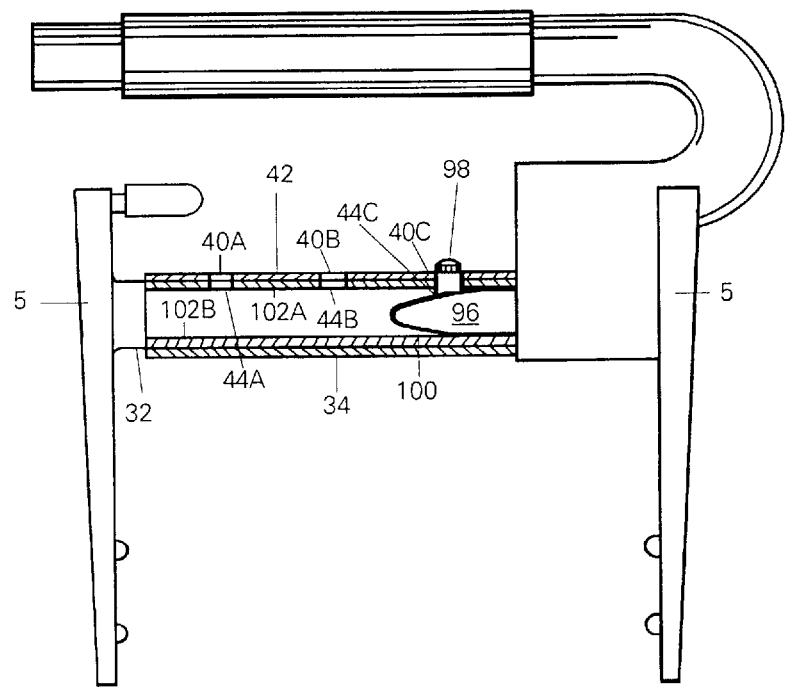
FIG. 5 is a cross-sectional view of an adjustable multi-purpose lifting apparatus for lifting ties, logs and the like broken on line 5—5 of FIG. 2 featuring the design of a telescopic horizontal structural member.
Figure 6:
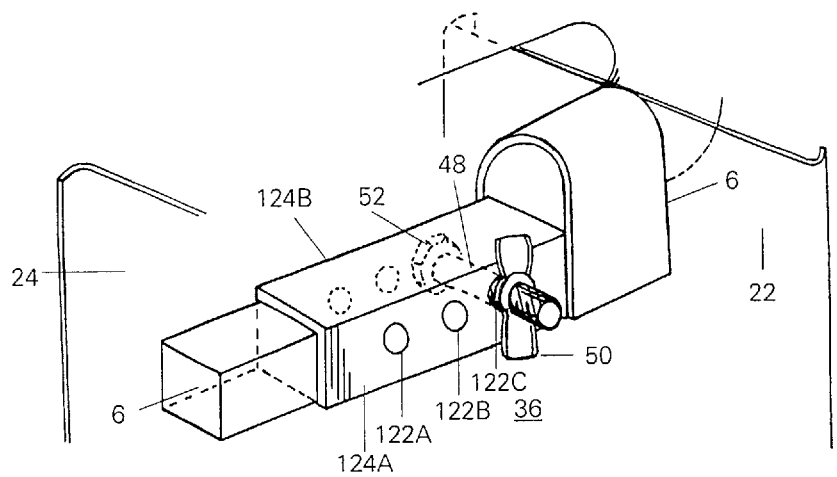
FIG. 6 is a perspective view of an adjustable multipurpose lifting apparatus for lifting ties, logs and the like featuring an alternate locking means along a telescopic horizontal structural member.

More detail is seen in FIG. 2 where locking means 36 is located within telescopic horizontal structural member 14. A preferred embodiment of locking means 36 consists of the first series of apertures 38A, 38B and 38C spaced along an outside surface 42 of female slide channel 26. More particularly, a first plurality of spaced orifices 40A, 40B and 40C along outside surface 42 of female slide channel 26 align with a second plurality of spaced orifices 44A, 44B and 44C along an outside surface 46 of male slide channel 28 to create first apertures 38A, 38B and 38C. Furthermore, this preferred embodiment of locking means 36 consists of a button spring 96 having as its components a leaf spring 100 and an integrally attached pin 98 which pass through first apertures 38A, 38B and 38C. Button spring means 96 is located vertically within telescopic horizontal structural member 14 as shown in FIG. 5. Another design of locking means 36 shown in FIG. 6 consists of a first nut and bolt 48 comprising first bolt 52 and first nut 50 which are inserted through horizontal apertures 122A, 122B and 122C to affix rotational gripping clamp 22 at a fixed distance from static gripping clamp 24 for holding tie 12. A preferred embodiment of first nut 50 is a wing nut. First nut 50 and first bolt 52 are inserted horizontally through both vertical sides 124A and 124B of telescopic horizontal structural member 14 and tightened to secure adjustable multi-purpose lifting apparatus 10 against tie 12.

Figure 4:
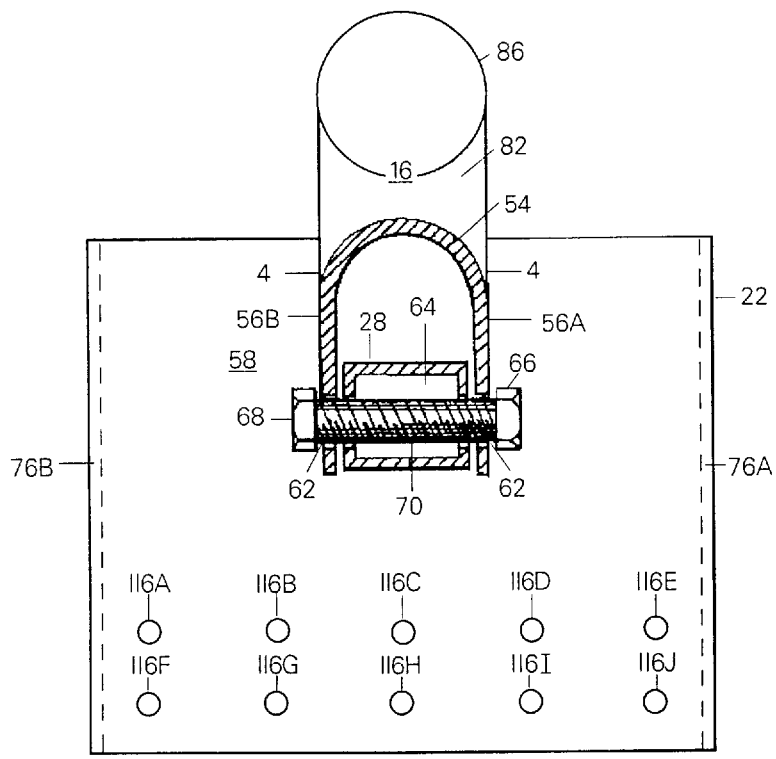
FIG. 4 is a cross-sectional view of an adjustable multi-purpose lifting apparatus for lifting ties, logs and the like broken on line 4—4 of FIG. 2 featuring the design of a fulcrum member.

Fulcrum member 16 is detailed in FIG. 4 and consists of a saddle collar 54 having spaced parallel legs 56A and 56B affixed to an inside surface 58 of rotational grip clamp 22 for acceptance of first end 60A of telescopic horizontal structural member 14. Second aperture means 62 allows for passage of second nut and bolt means 64 therethrough creating a pivotal shaft 70 about which rotational gripping clamp 22 moves a measured arc distance while fixedly connected to a first end 60A of telescopic horizontal structural member 14. Second nut and bolt means 64 consists of second nut 66, preferably a lock nut and second bolt 68. When tie 12 is to be lifted, rotational gripping clamp 22 naturally grasps an outside surface 114 of tie 12 as the upward lifting force of workman 112 is exerted by grasping lever handle grip 110.

Static gripping clamp 24 is constructed with at least two-spaced opposing static vertical ribs 72A and 72B located on an outside surface 74 of static gripping clamp 24. Rotational gripping clamp 22 consists of at least two-spaced opposing rotational vertical ribs 76A and 76B located on an outside surface 78 of rotational gripping clamp 22 making adjustable multi-purpose lifting apparatus 10 rugged and durable for lifting heavy loads like tie 12.

Figure 3:
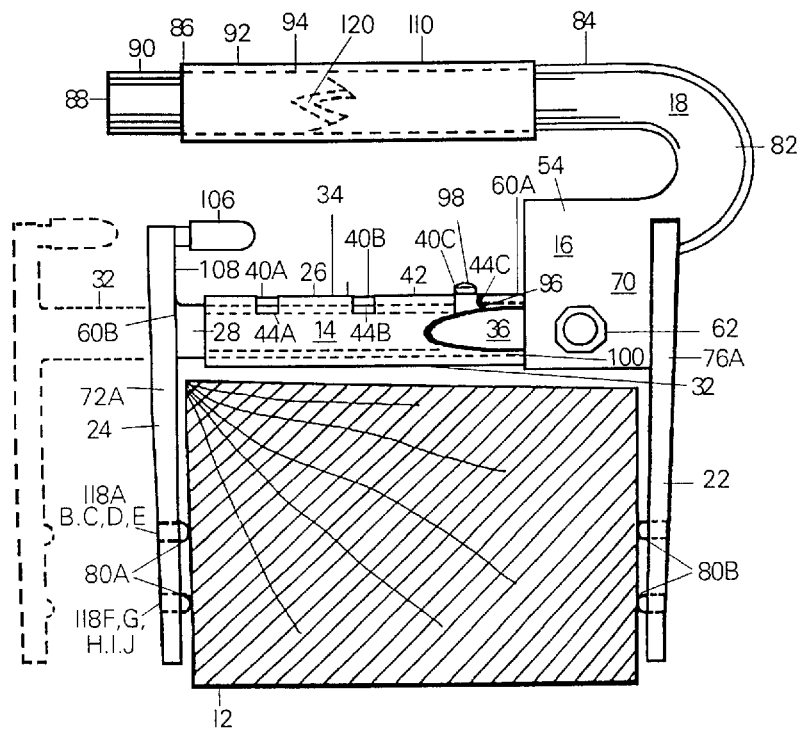
FIG. 3 is a side elevational view of an adjustable multi-purpose lifting apparatus for lifting ties, logs and the like showing a tie held between a pair of gripping clamps.

Static gripping clamp 24 is constructed with a first coarse inside surface 80A to prevent said tie 12 and the like from slipping and likewise rotational gripping clamp 22 is constructed with a second coarse inside surface 80B. First coarse inside surface 80A and second coarse inside surface 80B may be constructed of a sandpaper finished surface or in a preferred embodiment by punching a nodosity of indents as shown in FIGS. 2 and 3 being indents 118A, 118B, 118C, 118D, 118E, 118F, 118G, 118H, 118I and 118J through outside surface of static gripping clamp 74. Likewise, a nodosity of indents 116A, 116B, 116C, 116D, 116E, 116F, 116G, 116H, 116I, and 116J may be punched through outside surface of rotational gripping clamp 78 as shown in FIG. 4.

Arched level handle 18 is preferably constructed of a U-shaped tubular body 82 whereby upper elongated tubular member 84 consists of an open end 86 for holding a tool 88 of conforming tubular cross section at tool handle 90 for fitting into open end 86 of arched lever handle 18. A preferred embodiment of tool 88 is a cutting tool with a blade 120 at an end of tool 88 which is inserted into open end 86. Tool 88 may be any of a variety of tools such as a screwdriver, ice pick, chisel and the like. Tool 88 with blade 120 makes cutting a band or other cord which is wrapped around tie 12 in a bundle with other similar ties an easy task without the necessity of hunting for the needed implement, and at the same time, storing tool 88 securely. Outside surface 92 of tool 88 slides through and opposes inside surface 94 of upper elongated tubular member 84 and is secured safely with the blade 120 inward within tubular member 84 by frictional contact of outside surface 92 and inside surface 94.

FIG. 5 illustrates the details of button spring means 96. Previously mentioned, locking means 36 in its preferred embodiment consists of button spring means 96 and specifically leaf spring 100 lodged between opposing inside surfaces 102A and 102B of rigid male slide channel 28. Pin 98 is vertically attached to leaf spring 100 whereby pin 98 protrudes through first aperture means 38 to secure rigid female slide channel 26 to rigid male slide channel 28 to accommodate various widths of tie 12. Pin 98 is readily depressed to allow rigid male slide channel 28 to pass through rigid female slide channel 26 locking telescopic horizontal structural member 14 at variable desired widths and simultaneously transmitting a compressive force against outside surface 114 of tie 12 transmitted through rotational gripping clamp 22 and static gripping clamp 24. This force is illustrated as translational force 30 shown in FIG. 2.

Adjustable multi-purpose lifting apparatus 10 utilizes a release grip 106 horizontally located on an upper inside surface 108 of static gripping clamp 24 for alleviating pressure against railroad or decorative tie 12 when an upward force is exerted to release grip 106.

I claim:

1. An adjustable multi-purpose lifting apparatus for lifting ties, logs and the like comprising:
   a fulcrum member means including an arched lever handle for applying for rotational forces about a predetermined pivot point to an integrally attached rotational gripping clamp;
   a telescopic horizontal structural member including a rigid female slide channel and a rigid male slide channel, said rigid male channel being fixed to a static gripping clamp opposing said rotational gripping clamp, whereby said telescopic horizontal structural member is capable of translational movement by passing opposing surfaces of said rigid male slide channel and said rigid female slide channel for elongation or compression of said telescopic horizontal structural member, causing said rotational gripping clamp and said static gripping clamp to engage said ties, logs and the like;
   a locking means consisting of a first aperture means comprising a first plurality of spaced orifices arranged along an outside surface of said female slide channel and a second plurality of spaced orifices arranged along an outside surface of said male slide channel such that said first plurality of spaced orifices align with said second plurality of spaced orifices in opposing pairs for passage therethrough of a first nut and bolt means enabling a first nut to be securely affixed to a first bolt causing said rotational gripping clamp to be held at a fixed distance from said static gripping clamp;
   said fulcrum member means consisting of a saddle collar having a pair of spaced parallel legs affixed to an inside surface of said rotational gripping clamp arranged to accept a first end of said telescopic horizontal structural member, a second aperture means for passage of a second nut and bolt means therethrough creating a pivotal shaft about which said rotational gripping clamp moves on a measured arced distance while fixedly connected to said first end of said telescopic horizontal structural member.

2. An adjustable multi-purpose apparatus for lifting ties, logs and the like, according to claim 1 wherein said static gripping clamp is constructed with at least two spaced opposing static vertical ribs located on an outside surface of said static gripping clamp and said rotational gripping clamp likewise is constructed with at least two spaced opposing rotational vertical ribs located on an outside surface of said rotational gripping clamp.

3. An adjustable multi-purpose apparatus for lifting ties, logs and the like according to claim 1, wherein said static gripping clamp is constructed with a first coarse inside surface and said rotational gripping clamp is constructed with a second coarse inside surface to prevent said ties, logs and the like from slipping.

4. An adjustable multi-purpose apparatus for lifting ties, logs and the like according to claim 1, wherein said arched lever handle is constructed of a U-shaped tubular body whereby an upper elongated tubular member consists of an open end cavity for holding a tool of conforming tubular cross section for fitting into said open end cavity for containment within said arched lever handle.

5. An adjustable multi-purpose apparatus for lifting ties, logs and the like according to claim 4, wherein said open end cavity of said tubular body enables an outside surface of said tool to slide into or out of an inside surface of said upper elongated tubular member, said tool being secured by frictional contact of said outside surface with said inside surface.

6. An adjustable multi-purpose apparatus for lifting ties, logs and the like, comprising:
   a fulcrum member means including an arched lever handle for applying rotational forces about a predetermined pivot point to an integrally attached rotational gripping clamp, wherein said fulcrum member means consists of a saddle collar having a pair of spaced parallel legs affixed to an inside surface of said rotational gripping clamp arranged to accept a first end of said telescopic horizontal structural member;
   a telescopic horizontal structural member including a rigid female slide channel and a rigid male slide channel, said rigid male slide channel being fixed to a static gripping clamp opposing said rotational gripping clamp, whereby said telescopic horizontal structural member is capable of translational movement by passing opposing surfaces of said rigid male slide channel and said rigid female slide channel for elongation or compression of said telescopic horizontal structural member causing said rotational gripping clamp and said static gripping clamp to engage said ties, logs and the like;
   a locking means consisting of a first aperture means, whereby a first plurality of spaced orifices arranged along an outside surface of said rigid female slide channel and a second plurality of spaced orifices arranged along an outside surface of said rigid male slide channel cooperatively align for passage therethrough of a button spring means consisting of a pin secured to a spring means, said pin passing through said aperture means to secure said rigid female slide channel to said rigid male slide channel causing said rotational gripping clamp to be held at a fixed distance to said static gripping clamp;
   a second aperture means for passage therethrough of a second nut and bolt means creating a pivotal shaft about which said rotational gripping clamp moves on a measured arc distance while fixedly connected to said first end of said telescopic horizontal structural member.

7. An adjustable multi-purpose lifting apparatus for lifting ties, logs and the like, according to claim 6, wherein said spring means is located within said rigid male slide channel and consists of a leaf spring set between two opposing inside surfaces of said rigid male slide channel, said pin vertically secured to said leaf spring for passage through said first aperture means, such that by depressing said pin and sliding said rigid male slide channel through said rigid female slide channel, said adjustable multi-purpose lifting apparatus is capable of various lengths for transmitting a compressive force against an outside surface of said ties, logs and the like through said rotational gripping clamp and said static gripping clamp.

8. An adjustable multi-purpose lifting apparatus for lifting ties, logs and the like according to claim 7, wherein said static gripping clamp is constructed with at least two spaced opposing static vertical ribs on an outer surface of said static gripping clamp, a first coarse inside surface of said static gripping clamp to prevent ties, logs and the like from slipping, and likewise, a rotational gripping clamp is constructed with at least two spaced opposing rotational vertical ribs on an outer surface of said rotational gripping clamp, a second coarse inside surface of said rotational gripping clamp to prevent said ties, logs and the like from slipping.

9. An adjustable multi-purpose lifting apparatus for lifting ties, logs and the like according to claim 8, wherein said first coarse inside surface and said second coarse inside surface are constructed from a nodosity of inwardly directed indents.

10. An adjustable multi-purpose lifting apparatus for lifting ties, logs and the like according to claim 8, wherein a release grip is horizontally located on an upper inside surface of said static gripping clamp for alleviating pressure against said ties, logs and the like resultant in disengagement of said adjustable multi-purpose lifting apparatus from said ties, logs and the like by exerting an upward force to said release grip.

11. An adjustable multi-purpose lifting apparatus for lifting ties, logs and the like according to claim 8, wherein said arched lever handle is constructed with an open end cavity for containment of a cutting tool for cutting bands secured around said ties, logs and the like for packaging and shipment, said cutting tool having at a first tool end a beveled cutting edge and at a second tool end a tool handle for insertion into said open end cavity of said arched lever handle.

* * * * *